United States Patent [19]
Wood

[11] Patent Number: 5,810,117
[45] Date of Patent: Sep. 22, 1998

[54] AUTOMATED WORK PRODUCT LIFT ASSEMBLY

[76] Inventor: Russell Wood, 66 Bailey Rd., Lanesboro, Mass. 01237

[21] Appl. No.: 695,628

[22] Filed: Aug. 12, 1996

[51] Int. Cl.[6] ............................................. B66B 9/16
[52] U.S. Cl. ................................. 187/244; 187/273
[58] Field of Search ............................ 187/240, 244, 187/231, 238, 272, 273, 250, 269

[56] References Cited

U.S. PATENT DOCUMENTS

| | | | |
|---|---|---|---|
| 932,726 | 8/1909 | Steedman | 187/273 |
| 1,689,259 | 10/1928 | Shepard, Jr. et al. | 187/238 |
| 5,217,090 | 6/1993 | Billington, III et al. | 187/273 |
| 5,251,922 | 10/1993 | Mann | 187/244 |
| 5,542,500 | 8/1996 | Emrey | 187/244 |

Primary Examiner—Kenneth Noland

[57] ABSTRACT

An automated working platform is supported by an air cylinder to a specified air pressure of lift. The work product on the pallet provides an opposing force to the air pressure to achieve a desirable height of the work product within a specified range. The level is maintained as the work product is removed by decreasing the opposing force exerted by the work product.

9 Claims, 3 Drawing Sheets

Fig._1

AUTOMATED WORK PRODUCT LIFT ASSEMBLY

BACKGROUND OF THE INVENTION

Throughout the paper and related industries, materials and supplies are loaded and unloaded onto work platforms, pallets and the like. As the product is loaded on the pallet, the height of the product on the pallet increases from floor to eye level causing the loader much stress on leg, arm and back muscles.

It is known in the aircraft industry to support engine assemblies on pressurized pallets for ease in moving the assemblies along various work stations. Hydraulics, robotics and other such arrangements are used when similar heavy work products are involved. One example is found in US Pat. No. 5,439,200 entitled "Air Lifting and Balancing Unit".

It would be economically advantageous for both cost and health considerations to reduce the lift and strain associated with manual loading and unloading operations.

One object of the invention is to provide means for automatically adjusting the level of a pallet, platform and the like to an ergonomically sensitive height to minimize lifting strain when product is both loaded as well as unloaded from the associated pallet and platform.

SUMMARY OF THE INVENTION

An air cylinder is removably arranged under a pallet and the air pressure into the cylinder is adjusted to arrange the height of the pallet at waist level. As product is manually loaded onto the pallet, the height of the product remains at waist level. As the product is later unloaded from the pallet, the height of the product continues to remain at waist level.

DESCRIPTION OF THE PREFERRED EMBODIMENT

Figure 1:
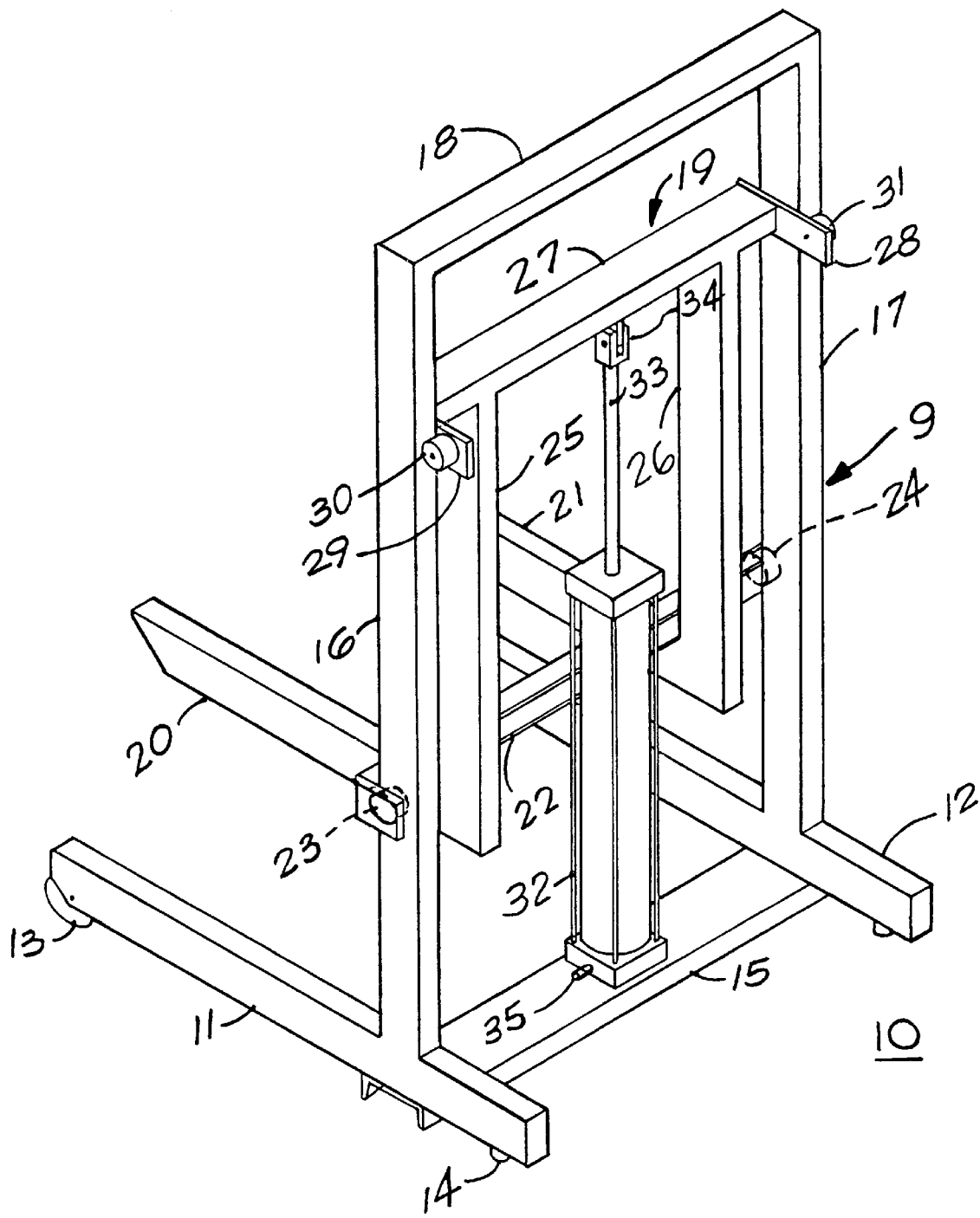
FIG. 1 is a top rear perspective view of the automated pallet control assembly according to the invention.

The automated loading and unloading assembly 10 of the invention, hereafter "automated assembly" is shown in FIG. 1 to comprise a support frame 9 consisting of a pair of support bars 11, 12 with wheels 13 and stops 14 on a bottom thereof for allowing ease in transfer. A bottom cross piece 15 joins the support bars 16, 17 at one end and a cross piece 18 joins the support bars at the opposite end to complete the support frame. A lift frame 19 is moveable arranged on the support frame 9 and consists of a pair of lift bars 20, 21 joined by a support-guide bar 22. The support-guide bar 22 is positioned against the support arms 16, 17 on one side by means of the guide rollers 23, 30 and on the other side by guide rollers 24, 31. A pair of support arms 25, 26 extend from the lift bars 20, 21 up to the cross piece 27. A lift cylinder 32 is positioned on the bottom cross piece 15 and is arranged under the cross piece 27 in such a manner that the piston 33 extends from the cylinder 32 and is fastened to the underside of the cross piece by means of a clevice 34. The cylinder contains a connector 35 that is arranged for connection with a compressed gas cylinder or to a central supply of compressed air or nitrogen.

Figure 2:
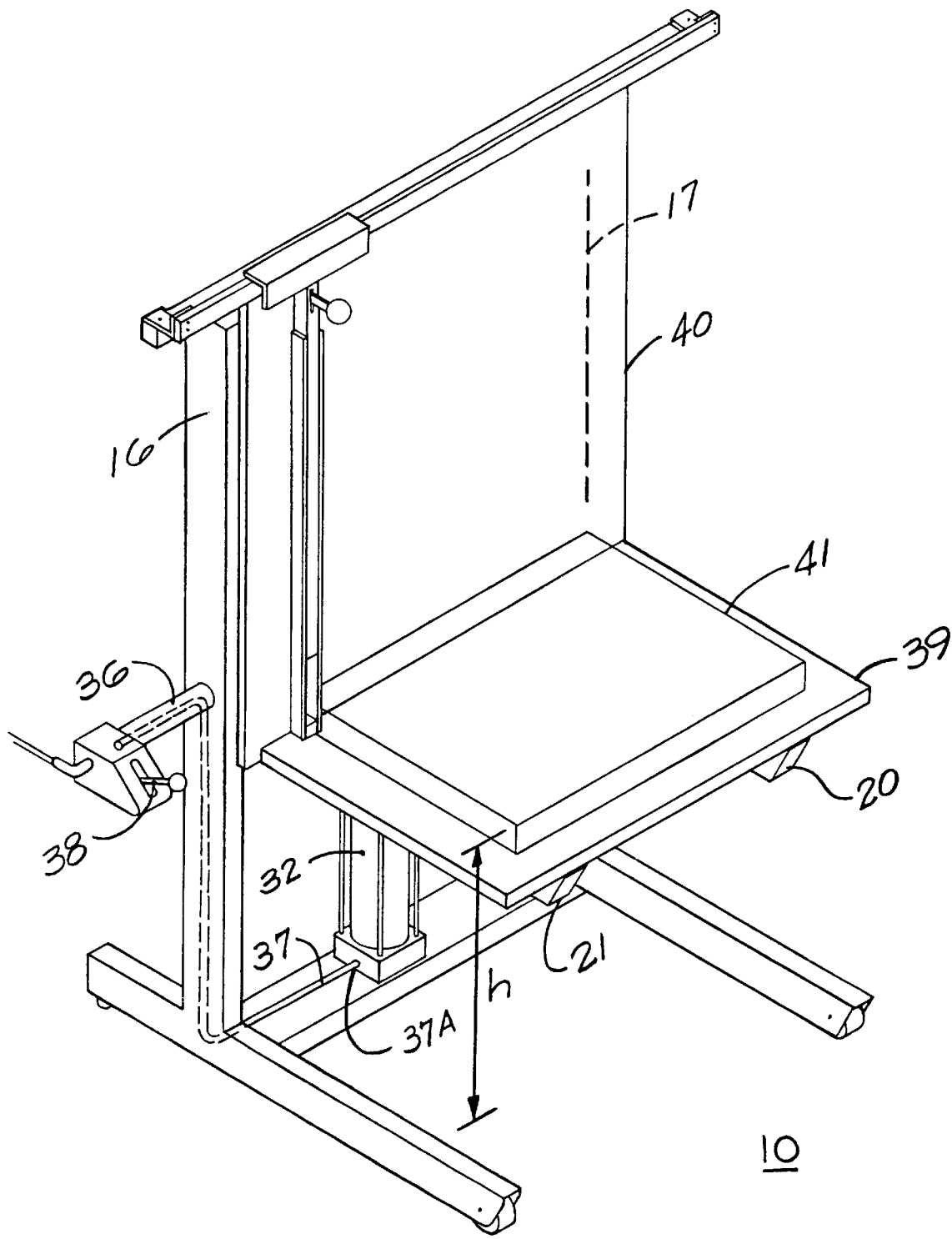
FIG. 2 is a top front perspective view of the assembly of FIG. 1 at the start of a loading operation.

The automated assembly 10 is depicted in FIG. 2 with a work platform 39 arranged on top of the lift bars 20, 21 and with a back plate 40 positioned against the support bars 16, 17. A three-way valve 38 connects with the cylinder 32 by means of the pipe 36 and the flexible high pressure hose 37, as indicated at 37A, for the purpose to be described below. In accordance with the teachings of the invention, the pressure to the cylinder is adjusted such the work product 41, which could comprise a stack of paper, is at the ideal height h above the floor to allow an operator to load the product with minimum body strain. As the product is continually loaded onto the platform 39, the weight of the product increases causing the air within the cylinder 32 to become compressed. Consequently, the height h of the product remains relatively constant as best seen by now referring to the automated assembly 10 shown in FIG. 3.

Figure 3:
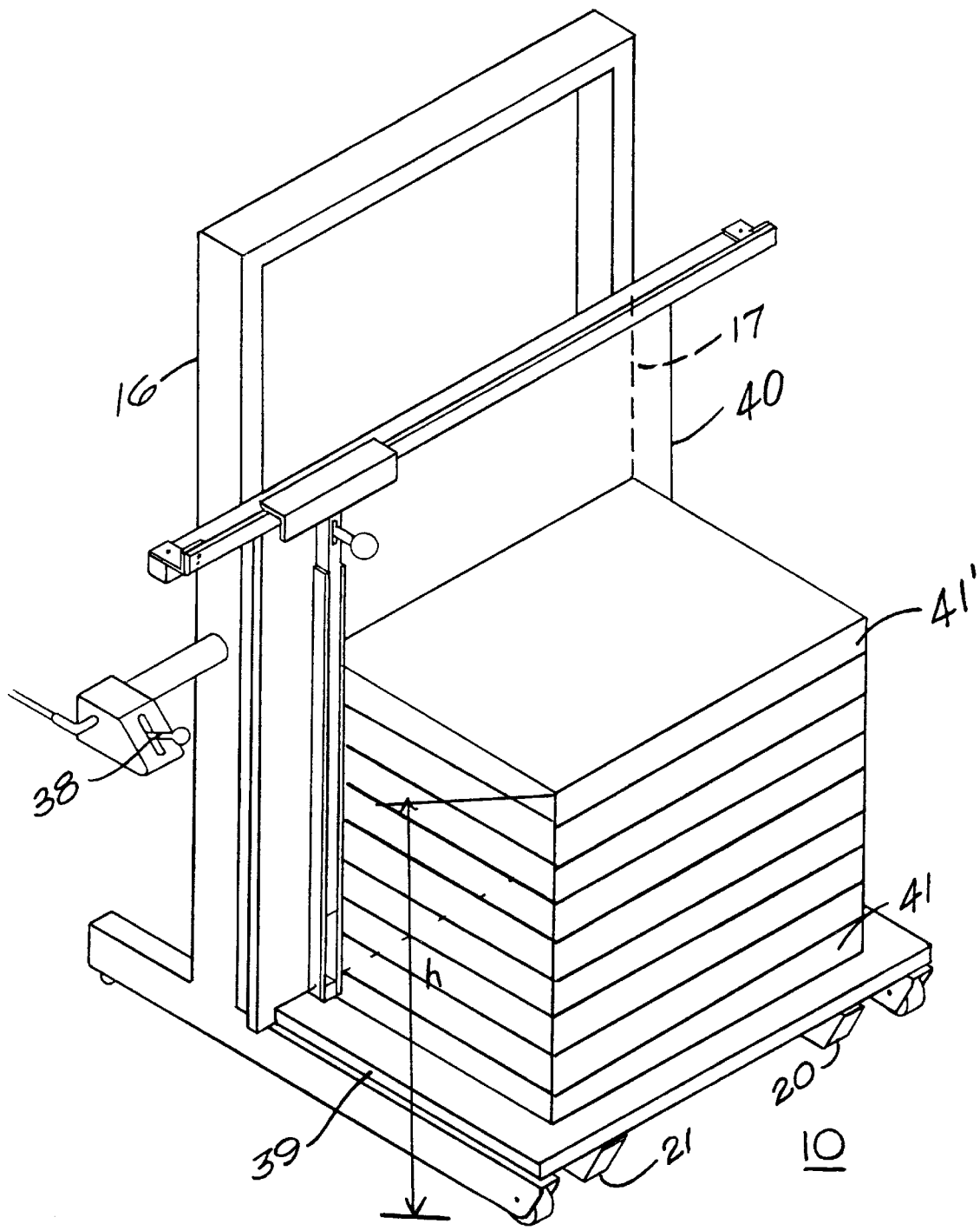
FIG. 3 is a top front perspective view of the assembly of FIG. 1 at the completion of the loading operation.

The platform 39 and the original work product 41 has dropped to the position indicated, while the last work product 41' is at the same height h as with the original product. When the last work product 41' is next removed from the platform 39, the force exhibited by the totality of products 41–41' continually decreases allowing the platform to raise continually until the original work product 41 and the platform 39 return to the positions indicated in FIG. 2. The three-way valve serves to increase the pressure to the cylinder 32 of FIG. 2, or decrease the pressure depending upon the density of the particular work product being loaded and unloaded from the platform 39. After the original pressure is determined, the valve 38 is set to the off position to prevent air from entering or leaving the cylinder thereby allowing the pressure in the cylinder to change and remain in equilibrium with the changing weight of the work product. The three-way valve also serves to adjust the pressure to the cylinder to compensate for the particular work product density as well as to compensate for the non-linear relationship between the changes in the weight of the work product and the resisting force provided by the compressibility of the gas in accordance with Boyle's Law. In factory environments, when the work product is fully loaded upon the automated lift assembly, as shown in FIG. 3, the forks of a fork lift truck (not shown) are inserted between the lift bars 20, 21 and the work platform 39. The last work product 41' is conveniently moved to the associated equipment upon which the work product is to be unloaded.

A simple and economical arrangement for loading and unloading work product from a platform has herein been described. The air pressure applied to the lifting cylinder is adjusted to automatically maintain the height of the load to remain at a location of minimum discomfort to an operator for ease in loading as well as unloading the work product.

I claim:

1. An automated lift assembly comprising:

a support frame;

a lift frame slidably arranged on said support frame;

a cylinder arranged on said support frame and adapted for connection to a source of compressed gas;

a piston extending from said cylinder, said piston being attached to said lift frame whereby said lift frame provides a constant height to a work product as said work product is added to and removed from said lift frame, said lift frame includes a pair of lift bars joined at one end by a guide bar and a pair of support arms extending from said lift bars, said support arms being joined by a top cross piece, an end of said piston is joined to said top cross piece by a clevice.

2. The lift assembly of claim 1 wherein said support frame includes a pair of support bars joined by a bottom cross piece.

3. The lift assembly of claim 1 wherein said support frame includes a pair of opposing support arms extending from said support bars, said support arms being joined by a top cross piece.

4. The product lift assembly of claim 1 wherein said guide bar includes a pair of rollers extending from opposite ends of said guide bar and overlapping one side of said support arms.

5. The product lift assembly of claim 4 wherein said top cross piece includes a pair of rollers positioned at opposite ends thereof, said rollers abutting an opposite side of said support arms, whereby said support arms are guided between said rollers and said plates as said lift frame moves vertically along said support frame.

6. The product lift assembly of claim 1 wherein said support bars include a pair of wheels on a bottom thereof at one end and a pair of stops on said bottom at and opposite end.

7. The product lift assembly of claim 1 including a valve connecting with said cylinder for admitting and releasing compressed gas to and from said cylinder.

8. The product lift assembly of claim 7 wherein said valve comprises a three-way valve.

9. The product lift assembly of claim 1 wherein said compressed gas is selected from the group consisting of air and nitrogen.

\* \* \* \* \*